Feb. 10, 1959 W. J. PORTER 2,873,089
SHUTTLE FOR CARRYING AUTOMOTIVE VEHICLES
Filed May 19, 1955 8 Sheets-Sheet 5
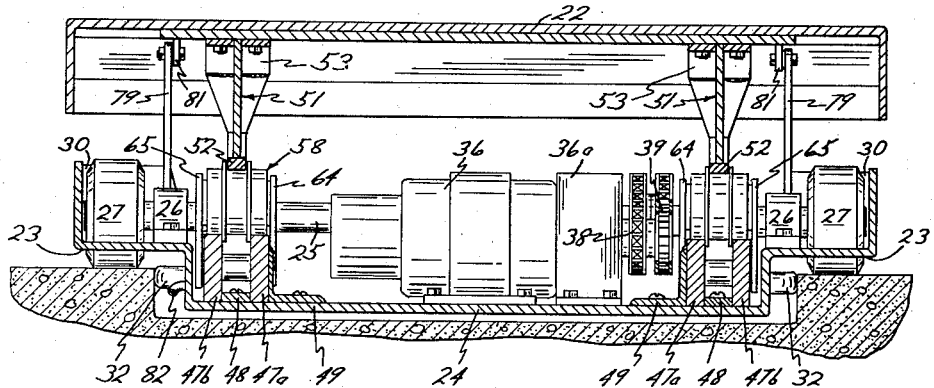
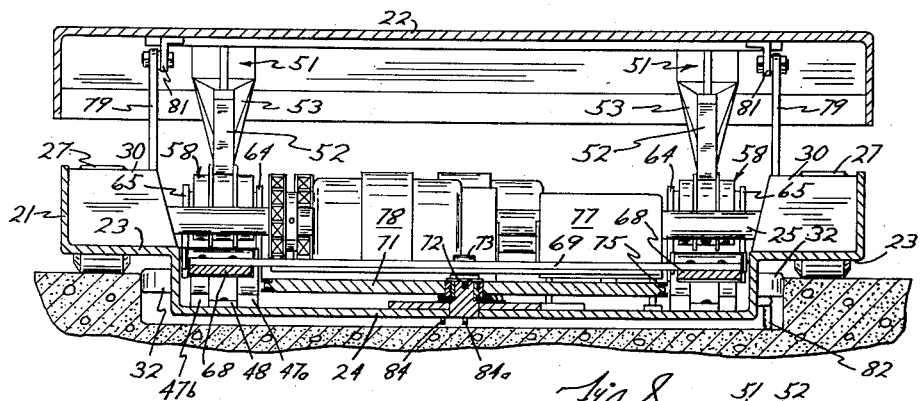
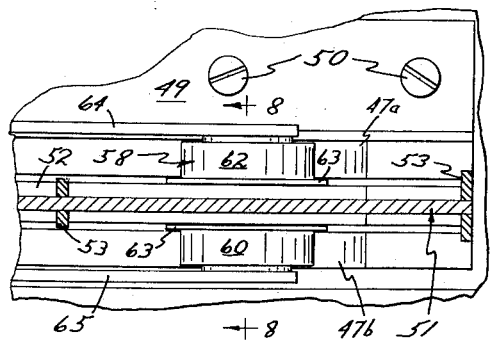
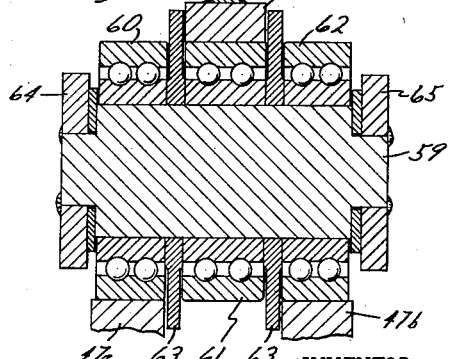
INVENTOR.
William J. Porter
BY
Atty.

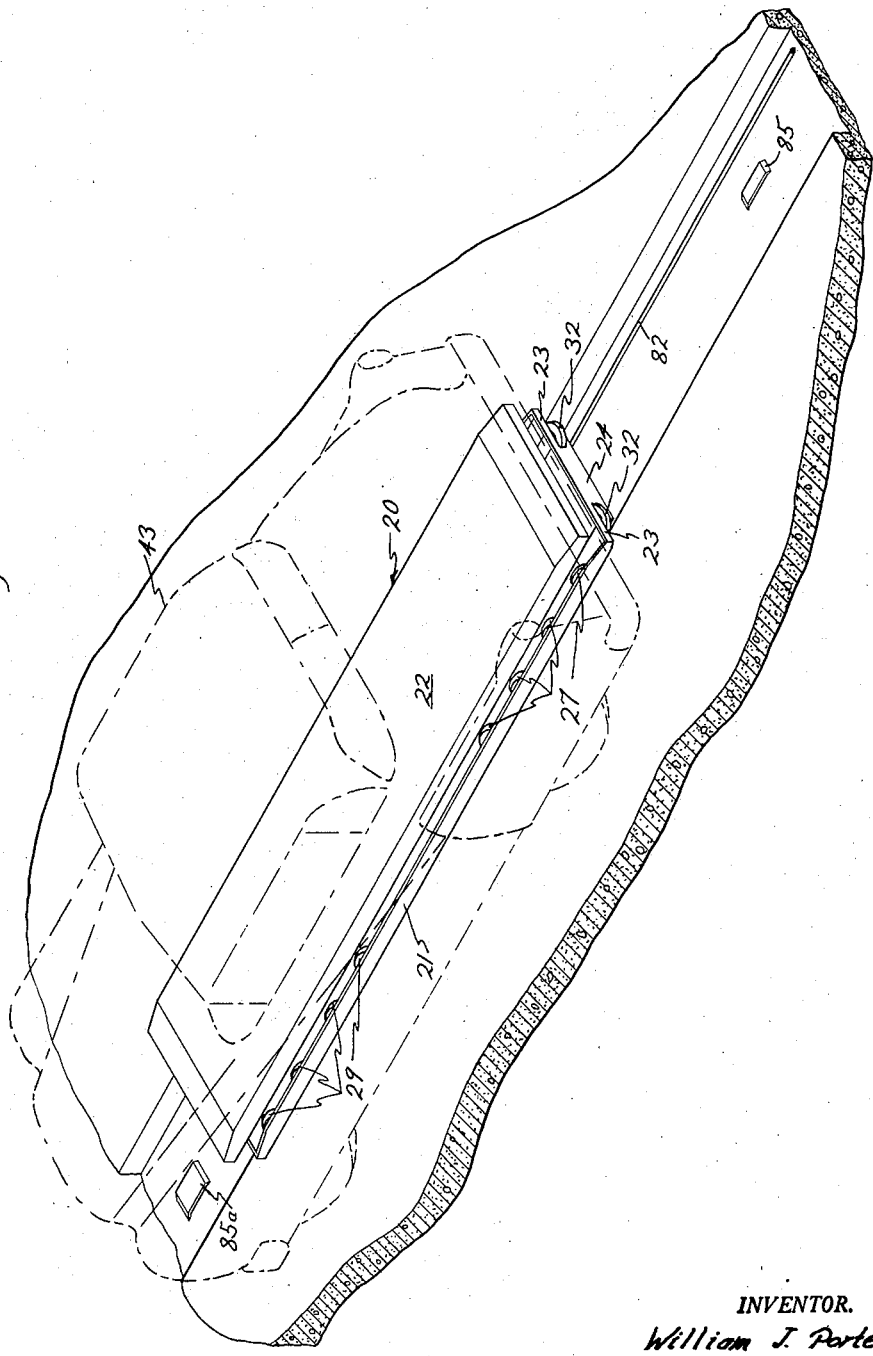

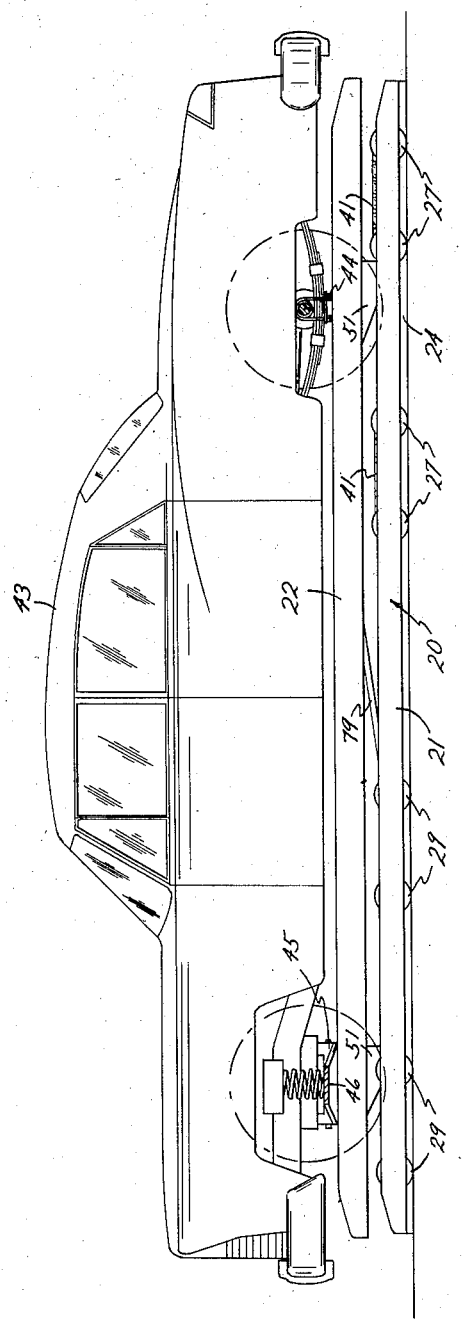

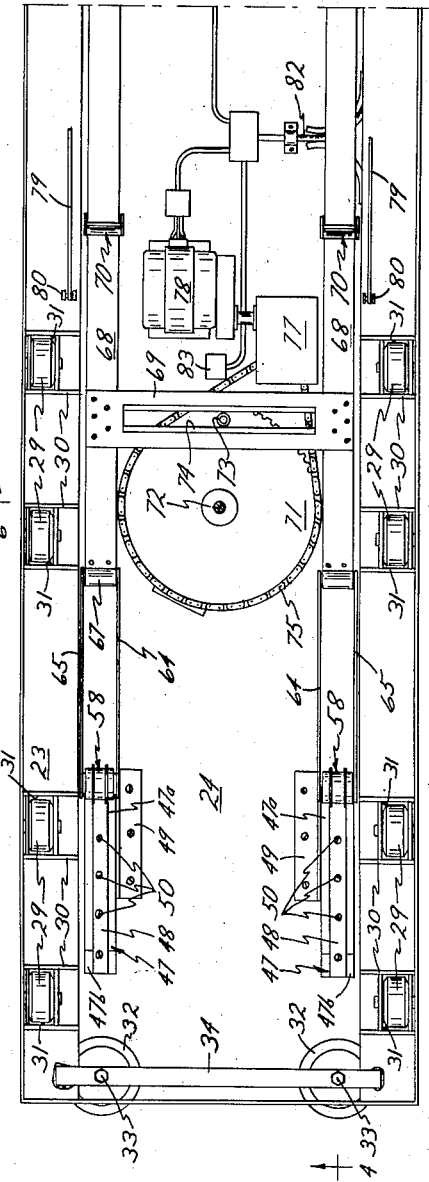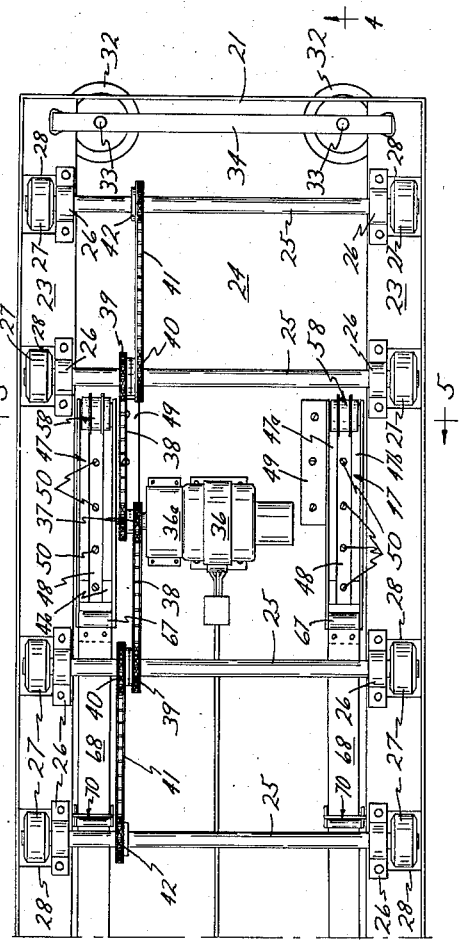

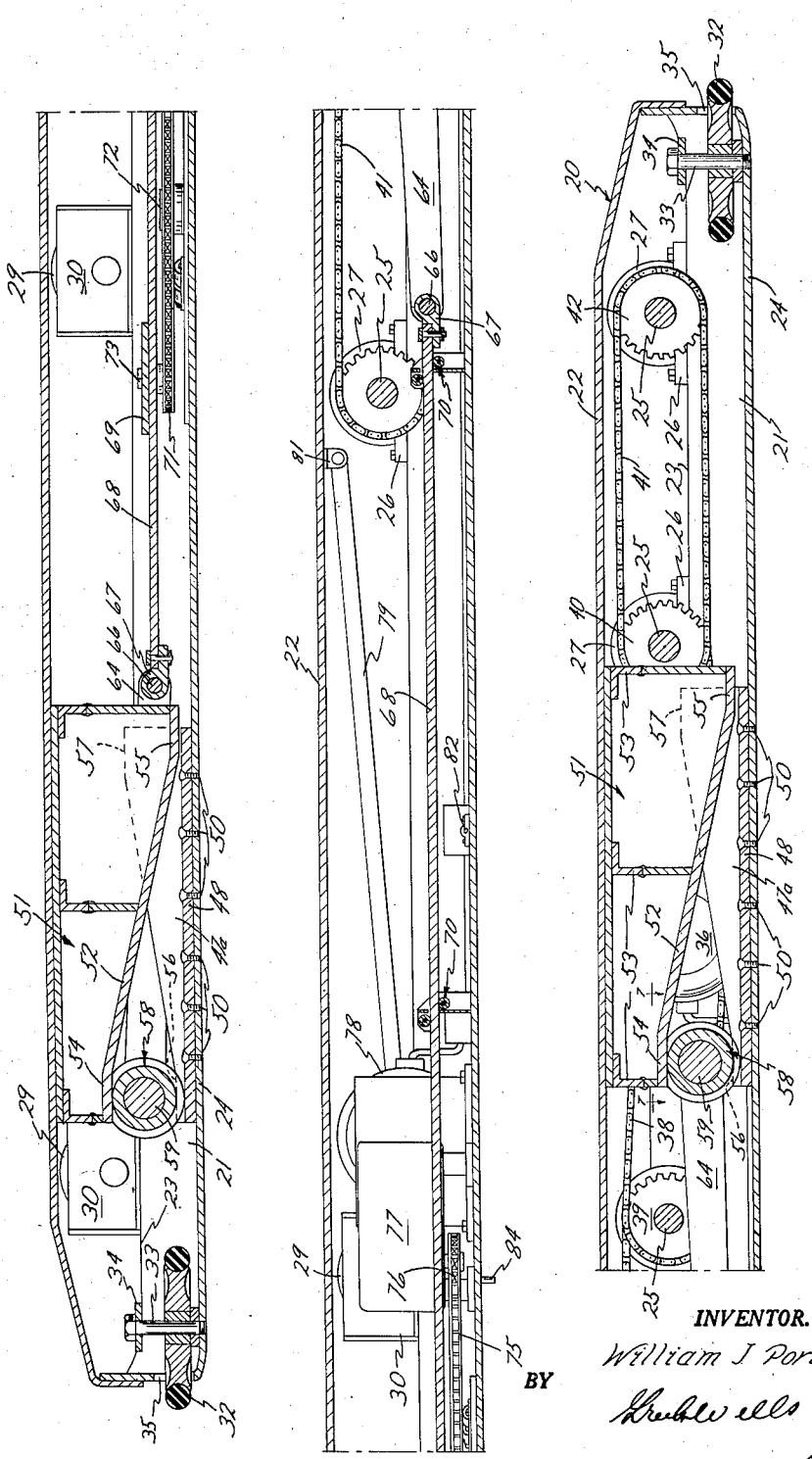

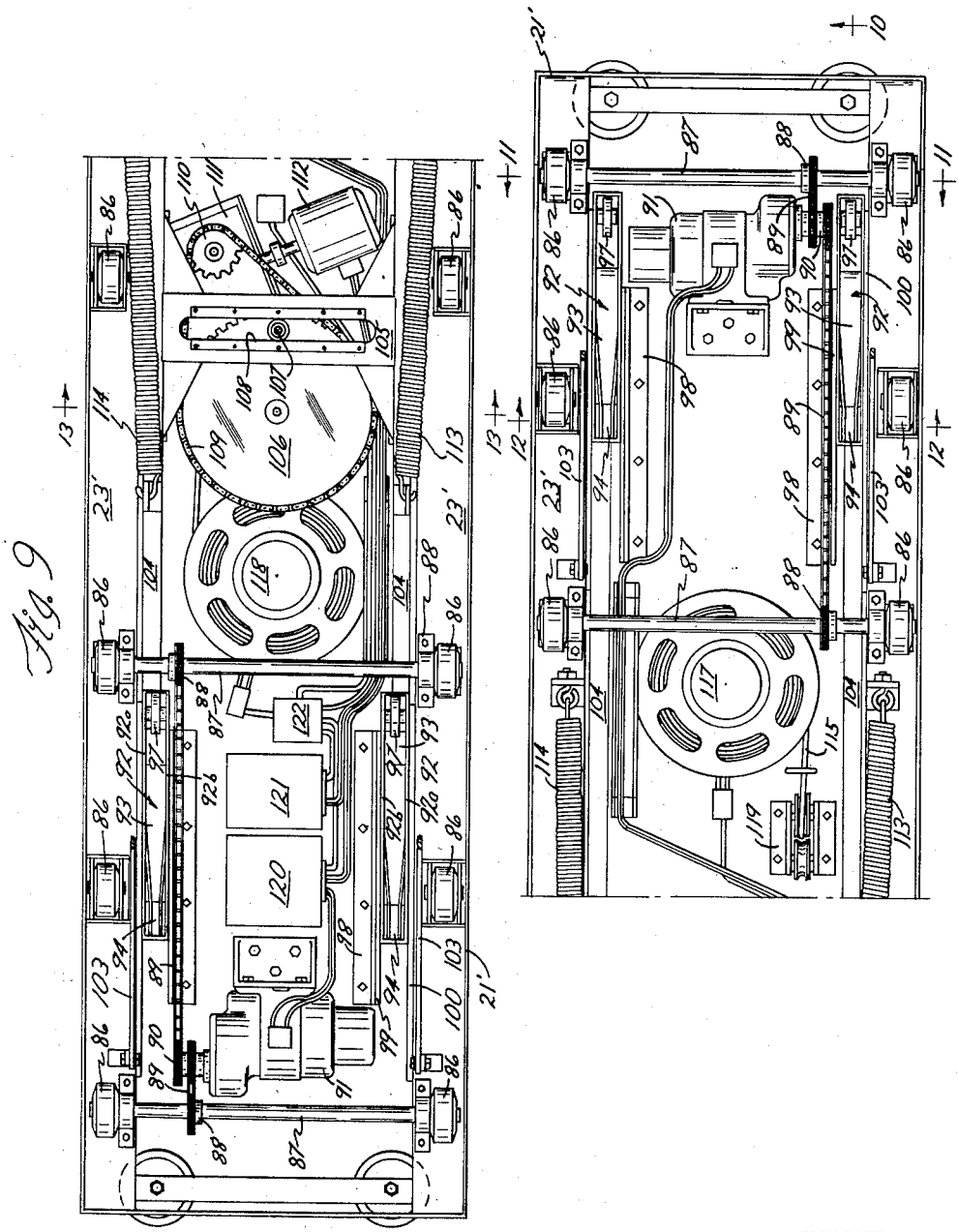

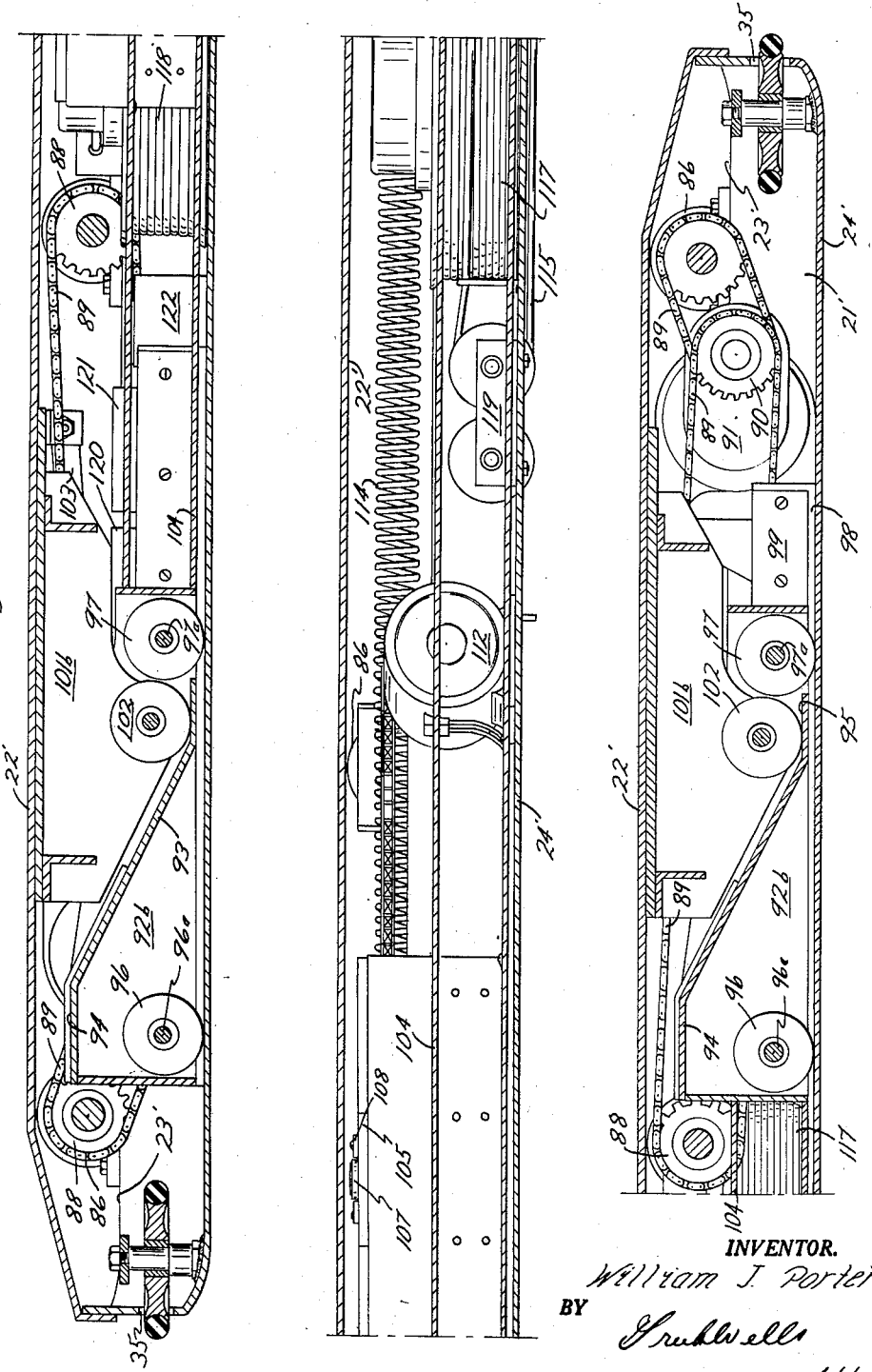

Feb. 10, 1959 — W. J. PORTER — 2,873,089
SHUTTLE FOR CARRYING AUTOMOTIVE VEHICLES
Filed May 19, 1955 — 8 Sheets-Sheet 8

INVENTOR.
William J. Porter
BY
Atty.

United States Patent Office 2,873,089
Patented Feb. 10, 1959

2,873,089

SHUTTLE FOR CARRYING AUTOMOTIVE VEHICLES

William J. Porter, Spokane, Wash., assignor to Parkmaster Systems Inc., Spokane, Wash., a corporation of Washington Application May 19, 1955, Serial No. 509,539

6 Claims. (Cl. 254—5)

The present invention relates to improvements in a shuttle for carrying automobiles and the like.

In the operation of modern parking systems wherein the automobiles are elevated into storage stalls it is desirable to provide means to lift the autos from their wheels and carry them into and out of the storage stalls. When such a means of handling the autos is employed, the owners thereof may lock them and leave the brakes set. Such a means provides more safety against loss by theft and also more speedy and safe operation of the parking system.

It is the principal purpose of this invention to provide a device capable of moving under an auto or other similar device, lifting it, moving it for considerable distances, depositing it, and returning.

Another purpose of the invention is to provide such a device which is controlled from a remote point, and which carries with it its own power means so that with the exception of control leads, it is entirely independent.

My shuttle comprises a body member supported on a plurality of wheels. A car supporting platform is positioned above the body member and carried thereon by a lifting mechanism mounted on the body member. Certain of the supporting wheels are powered by a motor on the body member, and the lifting mechanism is powered by a second motor on the body member. Power and control leads extend from the motors to a control station at some point remote from the shuttle. Operation of the motor connected to the supporting mechanism will cause the shuttle to roll on the supporting wheels, while operation of the motor connected to the lifting mechanism will cause the car supporting platform to be raised or lowered to pick up or deposit an automobile.

The shuttle is designed to run on spaced apart raised rails or along a shallow trench, and is narrow enough to pass between the two front or rear wheels of an automobile. When an auto is parked over the rails or trench, the shuttle may be moved under it, the platform raised to elevate the auto so that its wheels clear the ground and then moved off to deposit the auto in a parking stall.

The nature and advantages of my invention will appear more fully from the following description and the accompanying drawings, wherein the preferred forms of the invention are shown. The description and drawings are illustrative only, however, and are not intended to limit the invention except insofar as it is limited by the claims.

In the drawings:

Figure 1 is a perspective view of my invention positioned in a guiding trench and with the platform raised to support an automobile;

Figure 2 is an enlarged side elevational view of the shuttle illustrating the manner in which an automobile is supported thereon;

Figure 3 is an enlarged plan view of the shuttle with the car supporting platform removed to expose the lifting mechanism;

Figure 4 is an enlarged vertical sectional view taken on the line 4—4 of Figure 3;

Figure 5 is an enlarged vertical sectional view taken on the line 5—5 of Figure 3;

Figure 6 is an enlarged sectional view taken along the line 6—6 of Figure 3;

Figure 7 is an enlarged fragmentary sectional view taken on the line 7—7 of Figure 4;

Figure 8 is an enlarged fragmentary sectional view taken on the line 8—8 of Figure 7;

Figure 9 is a plan view similar to Figure 3 but showing a modified form of the invention;

Figure 10 is an enlarged vertical sectional view taken on the line 10—10 of Figure 9;

Figure 11:
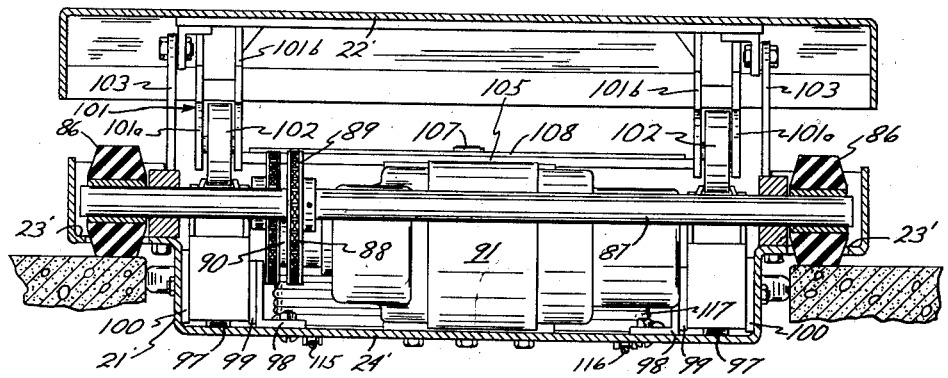
Figure 11 is an enlarged sectional view taken on the line 11—11 of Figure 9.

Referring to the drawings, and to Figures 1 and 2 in particular, my shuttle generally indicated by the numeral 20, comprises a lower, pan shaped body 21 which supports thereon a car supporting platform 22. The platform 22 is supported on the body 21 by a lifting mechanism described later herein and is capable of limited vertical movement toward and away from the body 21. The shuttle is designed to ride on two spaced apart tracks or along a shallow trench as shown in Figure 1. The body 21 has two longitudinal ledges 23 which extend over the sides of the trench, and a central body portion 24 which is positioned below the level of the ledges 23 and resides within the trench.

As shown best in Figures 3, 4 and 5, the body 21 is supported for movement along the trench by a plurality of wheel units. Adjacent one end of the body 21 are four axles 25 which are mounted in bearings 26 positioned on the ledges 23. The axles 25 have wheels 27 secured to each end over the ledges 23. Apertures 28 in the ledges 23 allow the wheels 27 to extend below the level of the ledges 23 to engage the ground at each side of the trench. Adjacent the opposite end of the body 21 four additional pairs of wheels 29 are mounted in frames 30 on the ledges 23. The wheels 29 extend through apertures 31 in the ledges 23 to support the body 21 for movement along the trench.

To guide the shuttle along the trench, a pair of horizontally disposed wheels 32 is positioned at each end of the body 21. Each of the wheels 32 is rotatably mounted on a vertical shaft 33 positioned at one corner of the central portion 24 of the body 21. The shafts 33 are supported at their lower ends by the floor of the portion 24 and at their upper ends by a strap 34 secured between the ledges 23. The wheels 32 extend through apertures 35 in the central portion 24 out beneath the ledges 23 a short distance so that they may engage the side of the trench to guide the shuttle 20.

In order to provide motive power to the shuttle 20 a drive motor 36 is mounted in the portion 24 of the body 21 near the axles 25. The motor 36 is connected through a speed reduction unit 36a to a pair of drive sprockets 37. Chains 38 drivingly connect the sprockets 37 to sprockets 39 on the middle pair of axles 25 mounting the drive wheels 27. These two middle axles 25 are drivingly connected by sprockets 40 and chains 41 to sprockets 42 on the remaining two axles 25. With this construction, operation of the motor 36 rotates the drive sprockets 37 and through the drive connection formed by the members 38, 39, 40, 41 and 42 rotates the four axles 25 and the drive wheels 27 to move the shuttle 20 along the trench.

The shuttle 20 must be narrow enough to pass between the front or rear wheels of an automobile and its total height with the platform 22 in the lowered position must be such that it can pass beneath an automobile. I have found that if the total height from the ground level of the wheels 27 and 29 is restricted to 5 or 5½ inches, the shuttle will have sufficient clearance to pass beneath all popular modern cars. The shuttle 20 is of substantially the same length as the average car so that when it is positioned beneath a car such as that shown at 43 in Figure 2, the platform 22 extends beneath both axles of the car 43. When the platform 22 is raised by the lifting mechanism, it engages the lowermost portions of the automobile carriage and lifts the wheels of the auto 43 from the ground a few inches. The majority of modern automobiles are constructed so that the lowest portions of the undercarriage are the rear axle spring shackles, indicated at 44 in Figure 2, and the hinge connections 45 of the lower, front wheel mounting lever arms 46. Lifting the car 43 from these points does no damage to the car or its parts. With some types of automobiles, the differential housing of the rear axle is engaged, and in others the engine block crankcase pan is engaged, but these members are strong enough to support the car without damage. I have found that in order to elevate all types of cars from the ground high enough to raise all four tires clear, the platform 22 must be capable of raising to a total height of 11 or 11½ inches from the ground level.

The lifting mechanism which supports the platform 22 on the body 21 will now be described. Within the central portion 24 of the body 21 and positioned near each end of the body 21 are four wedge members 47. As shown best in Figures 3, 4 and 5 the wedge members 47 are formed of two spaced apart vertical wedges 47a and 47b with a spacing strip 48 between them. An angle iron section 49 is secured to the wedge 47a to assist in the support of the member 47. Each of the wedge members 47 is rigidly secured to the body 21 by a plurality of screws 50. Directly above the members 47 are four upper wedges 51 mounted to the underside of the platform 22 and depending therefrom. The wedges 51 are positioned so that they may pass down between the wedges 47a and 47b when the platform is in the lowered position. As may be seen in Figure 4, the wedges 51 are positioned with respect to the wedge members 47 so that the thick or high ends of each are adjacent one another. Each of the wedges 51 has a face strip 52 at its lower edge, and has several reenforcing gusset plates 53 fixed to its sides to secure it in place. At the low end of each wedge 51, the face strip 52 has a horizontal portion 54. A similar horizontal portion 55 is formed at the high end of each wedge 51. In a like manner, each of the wedges 47a and 47b has a flat portion 56 at the low end and a flat portion 57 at the high end. Positioned between the wedges 47 and 51 is a roller unit 58 best shown in Figure 8. This unit 58 comprises a single shaft 59 with three roller bearings 60, 61 and 62 thereon. Spacers 63 are interposed between the roller bearings 60, 61 and 62. The spacers 63 are of somewhat larger diameter than the bearings. The roller units 58 are positioned between the wedge members 47 and the wedges 51 so that the center bearing 61 rides on the face strips 52 of the wedge 51. The two outer bearings 60 and 62 ride upon the sloping faces of the wedges 47a and 47b. The spacers 63 act as guides to keep the roller units 58 properly aligned.

When the platform 22 is in the lowered position, the roller units 58 are positioned at the low ends of the wedges so that the outer bearings 60 and 62 reside on the flat portions 56 of the wedges 47a and 47b, and the middle bearing 61 rests on the flat portion 54 of the wedge 51. In order to raise the platform 22, it is necessary to force the roller units 58 along the inclined faces of the wedges until they reach the high ends. In this position, the bearings 60 and 62 rest upon the flat portions 57 of the wedges 47a and 47b, and the center bearings 61 rest upon the horizontal faces 55 of the wedges 51. It can readily be seen that this movement of the roller units 58 will cause the platform 22 to be elevated to its raised position.

Each of the roller units 58 is provided with a pair of spaced apart actuating arms 64 and 65 which operate to move the units 58 from one end of the wedges 47 and 51 to the other. The arms 64 and 65 are secured to the opposite ends of the shaft 59 and are spaced apart sufficiently to extend along the opposite sides of the wedge units 47. The arms 64 and 65 are pivoted to pins 66 mounted in bearings 67 at the free ends of longitudinal bars 68. As best shown in Figure 3, there are two of the bars 68, one extending longitudinally of the body 21 adjacent each of the ledges 23, and aligned with two opposite wedge units 47. The bars 68 are connected by a cross member 69 to form a horizontal H-frame. The bars 68 are supported by guide members 70 at spaced intervals, and are free to move horizontally for a limited distance. By shifting the bars 68, the activating arms 64 and 65 pivoted thereto are caused to move the roller units 58 from one end of the wedge units 47 to the other, thereby raising or lowering the platform 22. To impart this movement to the bars 68, a large gear wheel 71 is rotatably mounted between them. The gear wheel 71 is mounted in a horizontal plane for free rotation on a shaft 72 secured to the body 21. An eccentric pin 73 is secured to the gear wheel 71 near the periphery thereof. The cross member 69 which connects the two bars 68 has a slot 74 therein which receives the pin 73. As may be seen from Figure 3, rotation of the gear wheel 71 will cause the cross member 69 to move longitudinally of the body 21 a distance equal to twice the distance from the pin 73 to the shaft 72 at the center of the gear 71. This distance must be equal to the length of the wedge units 47 from the lower horizontal face 56 to the upper horizontal face 57. The gear wheel 71 is rotated by a chain 75 driven from a sprocket 76. The sprocket 76 is connected to a reduction gear box 77 which receives power from a motor 78 mounted on the body 21. Rotation of the motor 78 is transmitted through the reduction gear box 77 to the sprocket 76 and then through the chain 75 to the wheel 71. Rotation of the wheel for 180 degrees is sufficient to move the bars from one extreme position to the other, and to raise or lower the platform. In Figure 3, the bars 68 are shown as positioning the roller units 58 at the high end of the wedge units 47 and the platform is raised. In Figure 4, the wheel 71 has rotated 180 degrees to lower the platform. It will be appreciated that, with this construction, the motor 78 need not be of the reversible type since a full turn of the wheel 71 in either direction will effect both a lowering and lifting operation.

Since the platform is raised by a movement of the roller units 58 against the inclined surfaces of the wedge units, a horizontal force is applied to the upper wedges 51 tending to move the platform 22 longitudinally of the body 21. To prevent such movement, a pair of radius arms 79 are provided between the body 21 and platform 22. The radius arms are pivoted to ears 80 on the body 21 and ears 81 on the platform. The radius arms 79 allow movement in a vertical direction but prevent horizontal movement of the platform 22.

Power for the motors 36 and 78 is provided by a power lead 82 which extends outwardly from the depressed central portion 24 of the body and follows the shuttle 20, dragging along the ditch or between the rails. The lead 82 is fed from a spring loaded reel (not shown) positioned at the central point from which the shuttle 20 operates. The power to the motors 36 and 78 is controlled from this point. However, when the shuttle is used in a parking system wherein certain storage stalls are provided for the automobiles, an automatic positioning control may be included in the shuttle itself to position it correctly within the stall to load and unload its burden. Such a control is shown in the figures. A switch box 83 is mounted at the center of the body 21 and has a switch lever 84 extending therefrom through the floor of the body 21. A trip block 85 (shown in Figure 1) is located in the stall so that it will actuate the switch lever 82 when the shuttle 20 passes over it, and stop the shuttle. If the parking stalls are designed to accommodate two cars, a second switch lever 84a may be provided and a second trip block 85a positioned in the stall. The necessary electrical connections between the switch box 83 and the power source for the shuttle form no part of this invention, and are not shown in the drawings. Any suitable circuit is sufficient.

The operation of the shuttle is extremely simple. The operator merely causes power to be supplied to the motor 36 to move the shuttle along the ditch. When he supplies power to the motor 78, the wheel 71 rotates, and through the eccentric pin 73 and the slotted cross member 69, the bars 68 are caused to move in the guides 70. Movement of the bars 68 causes the activating arms 64 and 65 to move the roller units 58 along the inclined faces of the wedge units, causing the upper wedges 51 to be forced up from the units 47 or causing the wedges 51 to be lowered to their lower position between the wedges 47a and 47b, thus raising or lowering the platform.

In the modified form of the invention, shown in Figures 9 through 13, the shuttle 20' is of a somewhat different design, although utilizing essentially the same principle of operation. In this form of the invention, the body 21' is essentially the same as in the main form, and a platform 22' is positioned above it as in the main form. Wheels 86 are provided to support the shuttle 20' in the same manner as the wheels 27 and 29 in the main form, but in a somewhat different location. Two sets of the wheels 86 adjacent each end of the body 21' are provided with axles 87, and are driven by means of sprockets 88 and chains 89 from drive sprockets 90 attached to motors 91 mounted on the body 21'.

Figure 12:
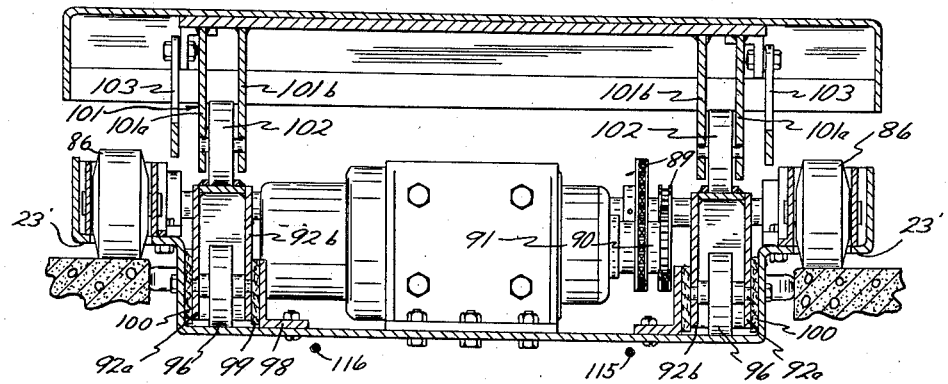
Figure 12 is an enlarged sectional view taken on the line 12—12 of Figure 9.
Figure 13:
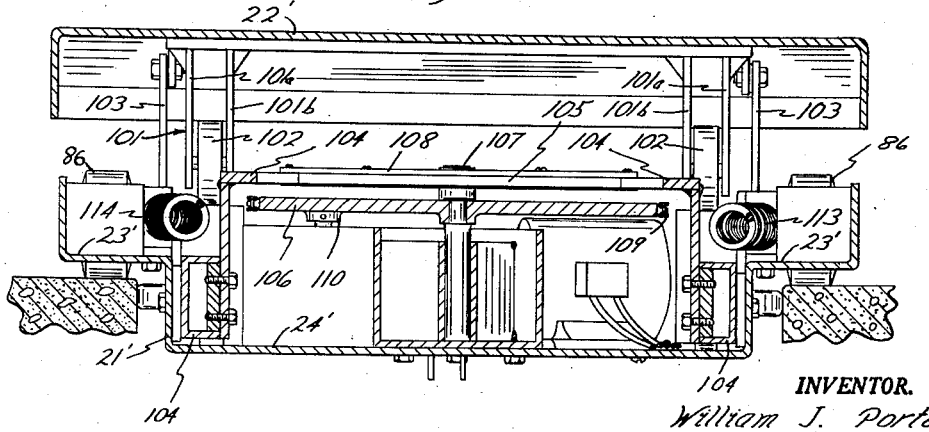
Figure 13 is an enlarged sectional view taken on the line 13—13 of Figure 9.

In this form of the invention the lifting mechanism for the platform utilizes the same principle of operation as in the main form. The raising and lowering of the platform is effected through the relative movement between inclined surfaces and roller members. As shown best in Figures 9 and 10, four wedge units 92 are positioned within the body 21', two at each end and just inside the ledges 23'. Each wedge unit 92 comprises two side plates 92a and 92b, between which an inclined plate 93 is secured. At the upper end of the plate 93 a horizontal portion 94 is provided and at the lower end, a like horizontal portion 95. The unit 92 is supported by two wheels 96 and 97 which are rotatably secured to axles 96a and 97a secured between the side plates 92a and 92b. With this construction, the units 92 are free to move on their wheels 96 and 97 within the body 21'. In order to support the units 92 in a vertical position, and to restrict their motion to a longitudinal direction, guides 98 are positioned beside the units 92. The guides 98 have bearing strips 99 on their wedge engaging faces to minimize wear. As shown in Figures 11 and 12, second bearing strips 100 are provided on the vertical walls of the central portion 24' of the body 21 so that the wedge units 92 are confined rigidly against all but longitudinal movement.

The platform 22' is provided with four depending roller units 101, so positioned that they cooperate with the wedges 92. The units 101 each comprise two spaced apart depending brackets 101a and 101b which mount therebetween a roller 102. The roller 102 rides upon the inclined plate 93 of the unit 92. As may be seen from Figure 10, when the wedges 92 are positioned so that the lower horizontal portion 95 of the plates 93 are beneath the rollers 102, then the roller units 102 extend down between the sides 92a and 92b of the wedge units 92. In this position, the platform 22' seats directly above the body 21' in its lower position. Longitudinal movement of the wedge units 92 will cause the roller 102 to ride up the inclined plates 93 to raise the platform until the rollers 102 reach the upper horizontal portions 94 of the plates 93 to bring the platform 22' in its raised position. The platform 22' must be held against horizontal movement with respect to the body 21' while it is raised, so radius arms 103 are provided as in the main form.

To impart the longitudinal movement of the wedge units 92 necessary to effect the raising and lowering of the platform 22' an H-shaped horizontal frame is provided as in the main form. This frame comprises a pair of longitudinal beams 104 which extend along the central portion 24' of the body 21' adjacent the ledges 23'. Each of these beams 104 connects two of the wedge units 92, and a crossmember 105 secures the beams 104 together. With this construction, any horizontal, longitudinal force applied to the crossmember 105 will cause the four wedge units 92 to move in unison between the bearing strips 99 and 100. To impart such force, a gear wheel 106 with an eccentric pin 107 is provided between the beams 104 and beneath the crossmember 105. The pin 107 is received by a slot 108 in the crossmember 105 to activate the wedges 92. The gear wheel 106 is driven by a chain 109 and sprocket 110 from a reduction gear box 111. A motor 112 supplies rotational power to the gear box 111. The operation of the wheel 106 to move the wedge units 92 back and forth beneath the roller units 101 is identical to that of the main form. In this form of the invention, however, means have been included to assist the motor 112 to raise the platform 22'. As will be understood from the drawings, the lowering movement of the platform 22' is effected by moving the wedge units 92 so that the rollers 102 are caused to ride down the inclined plates 93. The weight of an automobile on the platform will of course tend to assist this movement of the wedges 92 so that the motor 112 need not supply much horsepower, and may even act as a brake. In order to utilize the energy which the weight of the automobile imparts to the wedges 92, a pair of springs 113 and 114 are attached between the body 21' and the beams 104 as shown in Figure 9. When the beams 104 move to lower the platform 22' the springs 113 and 114 are extended, storing the energy transmitted by the weight of the auto on the platform 22'. Then when the platform 22' is raised by movement in the opposite direction, the springs 113 and 114 contract, giving up their energy to assist in raising the auto on the platform.

In this form of the shuttle, power is supplied to the drive motors 91 and the lifting motor 112 by a pair of cables 115 and 116. To minimize the wear on these cables through dragging, spring loaded cable reels 117 and 118 are provided in the shuttle 20' instead of at the remote control station. With this construction, cable is reeled out from the shuttle 20' as it moves from the station, instead of being dragged along. Fair leads 119 are provided to tend the cables 115 and 116 as they enter the body 21'.

Also in this form of the invention, the starting and control boxes, indicated at 120, 121 and 122 for the motors are carried on the shuttle to make it a self contained unit, independent of the control station except for the power supply cables 115 and 116.

The operation of the shuttles, 20 or 20' to pick up, transport, and deposit automobiles is simple and effective. The inclusion of a lifting mechanism comprising cooperating inclined surfaces and roller members allows the shuttle 20 or 20' to be entirely divorced from its control station except for the power leads. By utilizing such cooperating inclined surfaces and rollers, the vertical movement of the platform may be effected by a horizontal motion of either of the cooperating surfaces or rollers, thus allowing the prime mover of the lifting mechanism to operate in a horizontal direction and thereby reduce the necessary height of the unit to a minimum.

It is believed that the nature and advantages of my invention appear clearly from the foregoing description.

Having thus disclosed my invention, I claim:

1. A shuttle vehicle for lifting and transporting automobiles, etc., comprising a body member, wheels supporting the member, a plurality of spaced apart wedge members having inclined surfaces fixed to said body member, a supporting platform overlying the body member, inverted wedges having inclined surfaces mounted to the bottom of said platform above said wedge members, rollers between said wedge members and said inverted wedges and supporting said inverted wedges on the wedge members, said rollers aligned with said inverted wedges and wedge members to roll up and down their adjacent inclined surfaces, power means on the body member connected to said rollers operable to move the rollers along the inclined surfaces of said inverted wedges and wedge members whereby to raise and lower the platform, and links connecting the platform to the body member to restrain the platform against horizontal movement in relation to the body member.

2. A shuttle vehicle for lifting and transporting automobiles, etc., comprising a body member, wheels supporting the member, a plurality of spaced apart wedge members having inclined surfaces, fixed to said body member, a supporting platform overlying the body member, inverted wedges having inclined surfaces mounted to the bottom of said platform above said wedge members, rollers between said wedge members and said inverted wedges and supporting said inverted wedges on the wedge members, said rollers aligned with said inverted wedges and wedge members to roll up and down their adjacent inclined surfaces, power means on the body member connected to said rollers operable to move the rollers along the inclined surfaces of said inverted wedges and wedge members whereby to raise and lower the platform, and links connecting the platform to the body member to restrain the platform against horizontal movement in relation to the body member, said power means comprising a horizontal reciprocating frame on said body member, actuating arms pivoted to said frame and to said rollers, a cross member secured to said frame and having a transverse slot therein, a gear wheel mounted on said body member adjacent the cross member, a pin on said gear wheel and extending through the slot whereby to move the frame longitudinally upon rotation of the gear wheel, and a drive motor drivingly connected to said gear wheel.

3. A shuttle vehicle for lifting and transporting automobiles, etc., comprising a body member, wheels supporting the body member, four longitudinally extending spaced apart wedge members having inclined surfaces fixed to said body member, an automobile supporting platform overlying the body member, four inverted wedges depending from said platform, said inverted wedges being in vertical alignment with said wedge members and having inclined surfaces adjacent the wedge members, four roller members positioned on the inclined surfaces of said wedge members and supporting said inverted wedges thereon, power means on the body member operable to move the roller members along the inclined surfaces of said wedge members and said inverted wedges whereby to cause vertical movement of the inverted wedges with respect to the wedge members, said means comprising actuating arms pivoted to said roller members and extending longitudinally of the body member toward the center thereof, a horizontal reciprocating frame on the body member pivoted to said actuating arms, a vertical shaft mounted on the body member, a gear wheel rotatably mounted on said shaft, a cross member on the horizontal frame and having a slot therein extending transversely of said body member, a vertical pin on said gear wheel extending through said slot whereby to move the frame in a horizontal direction upon rotation of the gear wheel, and a drive motor on the body member drivingly connected to said gear wheel, and links pivoted between the platform and the body member whereby to restrain the platform against horizontal movement with respect to the body member.

4. A shuttle vehicle for lifting and transporting automobiles, etc., comprising a body member, wheels supporting the body member, four longitudinally extending spaced apart wedge members fixed to said body member, each of said wedge members comprising a pair of parallel wedge blocks having inclined surfaces thereon and being spaced apart, an automobile supporting platform overlying said body member, four longitudinally extending inverted wedges depending from said platform, said inverted wedges being in vertical alignment with said wedge members whereby to seat between said spaced apart wedge blocks of said wedge members, roller members positioned on the inclined surfaces of said wedge members and supporting said inverted wedges thereon, each of said roller members comprising a transverse shaft having three freely rotatable rollers thereon, one of said rollers engaging said inverted wedge and the other two of said rollers engaging the two wedge blocks of said wedge member, power means on the body member operable to move the roller members along the inclined surfaces of the wedge members and the inverted wedges whereby to cause vertical movement of the inverted wedges with respect to said body member, and links connected between the platform and the body member whereby to prevent horizontal movement of the platform with respect to the body member.

5. A shuttle vehicle for lifting and transporting automobiles, etc., comprising a body member, wheels supporting the body member, four longitudinally extending spaced apart wedge members fixed to said body member, each of said wedge members comprising a pair of parallel wedge blocks having inclined surfaces thereon and being spaced apart, an automobile supporting platform overlying said body member, four longitudinally extending inverted wedges depending from said platform, said inverted wedges being in vertical alignment with said wedge members whereby to seat between said spaced apart wedge blocks of said wedge members, roller members positioned on the inclined surfaces of said wedge members and supporting said inverted wedges thereon, each of said roller members comprising a transverse shaft having three freely rotatable rollers thereon, one of said rollers engaging said inverted wedge and the other two of said rollers engaging the two wedge blocks of said wedge member, power means on the body member operable to move the roller members along the inclined surfaces of the wedge members and the inverted wedges whereby to cause vertical movement of the inverted wedges with respect to said body member, said means comprising actuating arms pivoted to said roller members and extending longitudinally of the body member toward the center thereof, a horizontal reciprocating frame on the body member pivoted to said actuating arms, a vertical shaft mounted on the body member, a gear wheel rotatably mounted on said shaft, a cross member on the horizontal frame and having a slot therein extending transversely of said body member, a vertical pin on said gear wheel extending through said slot whereby to move the frame in a horizontal direction upon rotation of the gear wheel, and a drive motor on the body member drivingly connected to said gear wheel, and links pivoted between the platform and the body member whereby to restrain the platform against horizontal movement with respect to the body member.

6. A shuttle vehicle for lifting and transporting automobiles, etc., comprising a body member, wheels supporting the body member, four longitudinally extending spaced apart wedge members having inclined surfaces fixed to said body member, an automobile supporting platform overlying the body member, four inverted wedges depending from said platform, said inverted wedges being in vertical alignment with said wedge members and having inclined surfaces adjacent the wedge members, four roller members positioned on the inclined surfaces of said wedge members and supporting said inverted wedges thereon, power means on the body member operable to move the roller members along the inclined surfaces of said wedge members and said inverted wedges whereby to cause vertical movement of the inverted wedges with respect to the wedge members, said means comprising actuating arms pivoted to said roller members and extending longitudinally of the body member toward the center thereof, a horizontal reciprocating frame on the body member pivoted to said actuating arms, and links connecting the platform and body member opposing the horizontal thrust of said rollers.

References Cited in the file of this patent

UNITED STATES PATENTS

| | | |
|---|---|---|
| 1,527,136 | Hertner | Feb. 17, 1925 |
| 1,826,116 | Andrews | Oct. 6, 1931 |
| 2,113,986 | Kent | Apr. 12, 1938 |
| 2,243,206 | Hall | May 27, 1941 |
| 2,598,750 | Bargher | June 3, 1952 |
| 2,785,809 | Riblet | Mar. 19, 1957 |